(12) United States Patent
Miura et al.

(10) Patent No.: US 12,434,721 B2
(45) Date of Patent: Oct. 7, 2025

(54) INFORMATION PROCESSING DEVICE, MOVING DEVICE, STORAGE MEDIUM, AND INFORMATION PROCESSING METHOD TO MEASURE POSITION OF MOVING OBJECT

(71) Applicant: CANON KABUSHIKI KAISHA, Tokyo (JP)

(72) Inventors: Shoko Miura, Tokyo (JP); Makoto Tomioka, Kanagawa (JP); Daisuke Kotake, Kanagawa (JP); Ayato Imai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 191 days.

(21) Appl. No.: 17/752,696

(22) Filed: May 24, 2022

(65) Prior Publication Data
US 2022/0379903 A1    Dec. 1, 2022

(30) Foreign Application Priority Data
May 27, 2021   (JP) .................................. 2021-088860

(51) Int. Cl.
*B60W 50/02*   (2012.01)
*B60W 60/00*   (2020.01)
*G06V 20/56*   (2022.01)

(52) U.S. Cl.
CPC . *B60W 50/0205* (2013.01); *B60W 2050/0215* (2013.01); *B60W 60/0015* (2020.02);
(Continued)

(58) Field of Classification Search
CPC ......... B60W 2556/10; B60W 60/0015; B60W 2050/0215; B60W 2420/403;
(Continued)

(56) References Cited

U.S. PATENT DOCUMENTS

2017/0072566 A1*  3/2017  Murata ................. G01B 11/026
2017/0123434 A1*  5/2017  Urano ............... G08G 1/096791
(Continued)

FOREIGN PATENT DOCUMENTS

JP        2016173709 A     9/2016
JP        2017111606 A     6/2017
(Continued)

*Primary Examiner* — Anne Marie Antonucci
*Assistant Examiner* — Patrick M Brady
(74) *Attorney, Agent, or Firm* — Canon U.S.A., Inc. IP Division

(57) ABSTRACT

An information processing device measures a position of the moving object, acquires success or failure information relating to success or failure of the position measurement, acquires at least one of histories, determines to interrupt driving control of the moving object, and decides, if the driving control of the moving object is determined to be interrupted, a restart method. The histories include a history of the position of the moving object, a driving history of the moving object, a history of illuminance around the moving object, and a history of a direction of an imaging element mounted in the moving object. The driving control of the moving object is interrupted on the basis of the success or failure information. The restart method restarts the driving control of the moving object on the basis of at least one of the histories.

14 Claims, 5 Drawing Sheets

(52) U.S. Cl.
CPC ... *B60W 2420/403* (2013.01); *B60W 2556/10* (2020.02); *G06V 20/56* (2022.01)

(58) Field of Classification Search
CPC . B60W 50/0205; G06V 20/56; G06V 10/751; G06V 20/58
See application file for complete search history.

(56) References Cited

U.S. PATENT DOCUMENTS

| | | | |
|---|---|---|---|
| 2017/0261985 A1* | 9/2017 | Maeno | G05D 1/0088 |
| 2019/0126485 A1* | 5/2019 | Dubrovsky | B25J 9/1697 |
| 2020/0166931 A1* | 5/2020 | Park | G05D 1/0248 |
| 2020/0356093 A1* | 11/2020 | Shimamura | A01D 34/64 |
| 2021/0114532 A1* | 4/2021 | Fukushima | H04N 23/80 |
| 2022/0276386 A1* | 9/2022 | Mei | G01S 17/894 |

FOREIGN PATENT DOCUMENTS

| | | | |
|---|---|---|---|
| JP | 2019168942 A | 10/2019 | |
| JP | 2020-003870 A | 1/2020 | |

\* cited by examiner

INFORMATION PROCESSING DEVICE, MOVING DEVICE, STORAGE MEDIUM, AND INFORMATION PROCESSING METHOD TO MEASURE POSITION OF MOVING OBJECT

BACKGROUND

Field

The present disclosure relates to an information processing device, a moving device, a storage medium, an information processing method, and the like that make it possible to measure the position of a moving object.

Description of the Related Art

A technique for unmanned traveling of a moving object such as a robot through a position measurement process using images captured by an image capture device is becoming widespread. In particular, attention is being paid to automating logistics by installing support for such a technique in an automatic guided vehicle (AGV) that travels autonomously in a factory, a warehouse, or the like.

In a device like that described above, if the position measurement process fails or the reliability of the position measurement process is low, autonomous traveling cannot be performed and control of the moving object becomes unstable. In order to control the moving object again and allow the moving object to travel independently, it is necessary to reset the position measurement process.

On the other hand, Japanese Patent Laid-Open No. 2020-3870 discloses a technique in which an image processing device that estimates the position and posture of an object on the basis of an image of the object displays a reference image and performs a process of estimating the position and posture if the device fails to estimate the position and posture of the object. However, the technique disclosed in Japanese Patent Laid-Open No. 2020-3870 is a technique for estimating the position and posture of an object, and even if this technique is applied to a moving object that travels autonomously, the position measurement process cannot be appropriately restarted automatic ally.

SUMMARY

According to an aspect of the present disclosure, an information processing device includes a processor configured to function as a position measurement unit, a success or failure information acquisition unit, a history acquisition unit, a determination unit, and a decision unit. The position measurement unit is configured to measure a position of a moving object. The success or failure information acquisition unit is configured to acquire success or failure information relating to success or failure of position measurement performed by the position measurement unit. The history acquisition unit is configured to acquire at least one of a history of the position of the moving object, a driving history of the moving object, a history of illuminance around the moving object, and a history of a direction of an imaging element mounted in the moving object. The determination unit is configured to determine to interrupt driving control of the moving object on the basis of the success or failure information acquired by the success or failure information acquisition unit. The decision unit is configured to, in a case where the determination unit determines that the driving control of the moving object is to be interrupted, decide a restart method of restarting the driving control of the moving object on the basis of at least one of the histories acquired by the history acquisition unit.

Further features of the present disclosure will become apparent from the following description of embodiments with reference to the attached drawings.

DESCRIPTION OF THE EMBODIMENTS

An object of the present disclosure is to present an information processing device capable of deciding an appropriate restart method, for example, if the measurement of the position of a moving object fails. Hereinafter, with reference to the accompanying drawings, favorable modes of the present disclosure will be described using Embodiments. In each diagram, the same reference signs are applied to the same members or elements, and duplicate description will be omitted or simplified. Meanwhile, in following embodiments, although an example in which an information processing device is applied to a moving object (moving device) that travels autonomously such as an AGV will be described, the moving object (moving device) is not limited to an AGV, and the information processing device can also be applied to a drone, various robots, and the like. In the following, the term "unit" may refer to a software context, a hardware context, or a combination of software and hardware contexts. In the software context, the term "unit" refers to a functionality, an application, a software module, a function, a routine, a set of instructions, or a program that can be executed by a programmable processor such as a microprocessor, a central processing unit (CPU), or a specially designed programmable device or controller. In the hardware context, the term "unit" refers to a hardware element, a circuit, an assembly, a physical structure, a system, a module, or a subsystem. It may include mechanical, optical, or electrical components, or any combination of them. It may include active (e.g., transistors) or passive (e.g., capacitor) components. It may include semiconductor devices having a substrate and other layers of materials having various concentrations of conductivity. It may include a CPU or a programmable processor that can execute a program stored in a memory to perform specified functions. It may include logic elements (e.g., AND, OR) implemented by transistor circuits or any other switching circuits. In the combination of software and hardware contexts, the term "unit" refers to any combination of the software and hardware contexts as described above.

Figure 1:
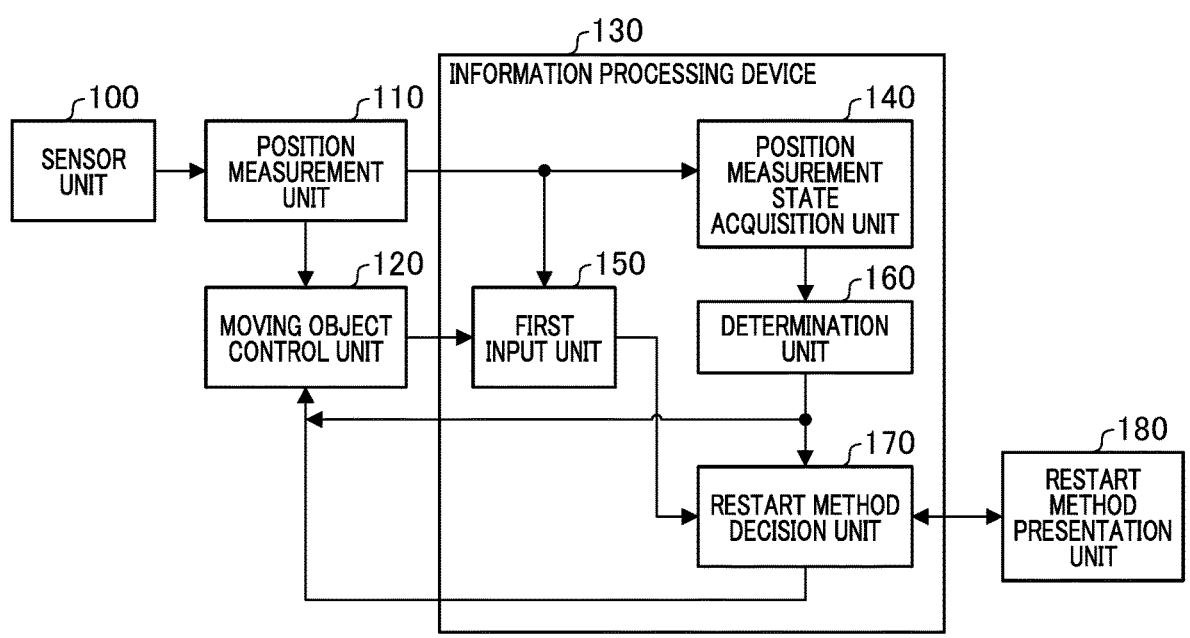
FIG. 1 is a functional block diagram of a moving object including an information processing device of a first embodiment.

[First embodiment] FIG. 1 is a functional block diagram of a moving object including an information processing device of a first embodiment. In FIG. 1, 1000 is a moving object serving as a moving device, 100 is a sensor unit including an imaging element such as a complementary metal oxide semiconductor (CMOS) sensor for acquiring an image of the surroundings of the moving object, 110 is a position measurement unit, 120 is a moving object control unit, 130 is an information processing device, and 180 is a restart method presentation unit.

The imaging element of the sensor unit 100 is installed at a predetermined position, for example, in front of the moving object, and is configured to acquire an image in a predetermined viewing angle range viewed from the front of the moving object. The information processing device 130 includes a position measurement state acquisition unit 140, a first input unit 150, a determination unit 160, a restart method decision unit 170, and the like.

Meanwhile, the moving object 1000 has a driving unit such as, for example, a motor or an engine (not shown) which serves as a driving source for moving the moving object, and the driving unit is controlled by the moving object control unit 120. Meanwhile, the restart method presentation unit 180 is, for example, a display of a user-operated terminal such as a smartphone or a personal computer (PC) connected through, for example, a wireless network which is separate from the moving object 1000. Meanwhile, the restart method presentation unit 180 serving as a user-operated terminal may be provided in the moving object 1000.

The moving object 1000 has a built-in central processing unit (CPU) as a computer, and controls the operation of each unit of the entire device on the basis of a computer program stored in a memory. In addition, the functional block shown in FIG. 1 shows a function which is realized by a computer.

The position measurement unit 110 periodically performs the measurement of the position of the moving object or the like using a captured image of the surroundings of the moving object captured by the sensor unit 100, and stores and outputs information on the measured position of the moving object or the like as history information.

That is, the position measurement unit 110 has a memory inside of it, and stores and outputs various measurement results when a position measurement process is periodically performed as history information. The above history information includes a history of position information at each point when the position measurement process is performed, that is, position history information relating to a history of the position of the moving object, and history information including information on a date and time when position measurement at each point is performed.

Furthermore, the above history information includes history information of success or failure information relating to the success or failure of position measurement. Here, the success or failure information includes reliability information relating to the reliability of the position measurement process. In addition, the success or failure information is, for example, information such as whether the reliability of the position measurement process result is equal to or higher than a predetermined threshold.

The position measurement state acquisition unit 140 functions as a success or failure information acquisition unit, and acquires at least success or failure information relating to the success or failure of position measurement (such as reliability information relating to the reliability of the position measurement process) from the position measurement unit 110. The success or failure information acquired here is input to the determination unit 160, and whether to interrupt driving control of the moving object (such as the movement of the moving object or rotation control in the direction of the moving object) is determined on the basis of the success or failure information.

If the determination unit 160 determines that the driving control of the moving object is not to be interrupted, that is, if control of the moving object is to be continued, the moving object control unit 120 performs driving control such as that of autonomous traveling on the moving object using the position measurement result of the moving object obtained by the position measurement unit 110 as moving object control.

On the other hand, if the determination unit 160 determines that the driving control of the moving object is to be interrupted, the moving object control unit 120 interrupts the driving control of the moving object. The restart method decision unit 170 functions as a decision unit that decides a method of restarting the driving control of the moving object on the basis of at least one of the various types of history information described above acquired by the first input unit 150 from the position measurement unit 110.

Here, the restart method includes at least one of a return position which is a point for restarting the driving control of the moving object and a method of driving the moving object for returning to the return position (such as a movement path, movement speed, or rotation). Meanwhile, here, the first input unit 150 functions as a history acquisition unit that acquires the various types of history information described above from the position measurement unit 110.

If the return position which is the restart method and the method of driving the moving object for returning to the return position are decided, the moving object control unit 120 restarts the control of the moving object in accordance with the decided restart method. In addition, the restart method presentation unit 180 presents the restart method decided by the restart method decision unit 170 to a user who is using or operating the moving object. The restart method presentation unit 180 may also present the success or failure of position measurement acquired by the position measurement state acquisition unit 140.

Figure 2:
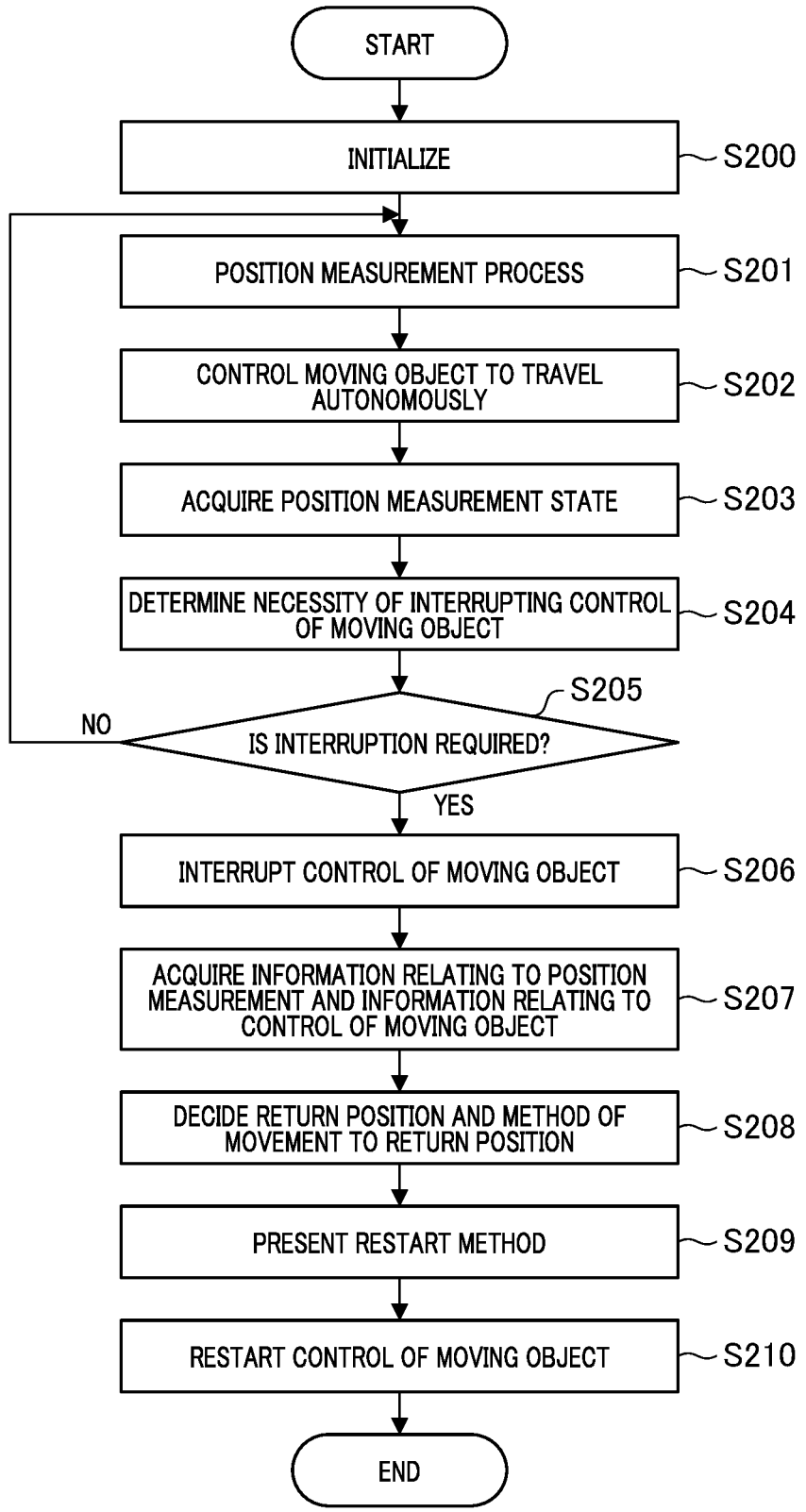
FIG. 2 is a flowchart illustrating information processing of the first embodiment.

FIG. 2 is a flowchart illustrating information processing of the first embodiment. The operation of each step in the flowchart of FIG. 2 is performed by a computer in the moving object 1000 executing a computer program stored in a memory. In step S200, the return position, an initial value used for a movement method, a threshold required for determining the necessity of interrupting the control of the moving object, and the like are set.

The position measurement process is performed in step S201 (position measurement step). In the present embodiment, a captured image captured by the sensor unit 100 is applied to the technique of simultaneous localization and mapping (SLAM), and the measurement of the position of the moving object and the creation of an environment map indicating the arrangement of indexes for the position measurement are simultaneously performed. From the position of the moving object obtained in this way, the moving object control unit 120 performs control so that the moving object travels independently in step S202.

Next, in step S203 (success or failure information acquisition step), the position measurement state acquisition unit 140 acquires a position measurement state. The position measurement state acquired here is the success or failure of the position measurement process (such as reliability information) processed in step S201. The determination unit 160 determines the necessity of interrupting the control of the moving object in step S204 (determination step) on the basis of the position measurement state acquired in step S203, and determines whether to perform interruption in step S205.

In the case of No in this determination, the control of the moving object can be continued, and the process returns to step S201 to perform repeated control. If it is determined that the control of the moving object is to be interrupted (if Yes is determined), the process proceeds to step S206.

The driving control of the moving object is interrupted in step S206. The first input unit 150 acquires information relating to position measurement and various types of history information relating to the control of the moving object in step S207 (history acquisition step). In the present embodiment, the history information is acquired as information relating to the position measurement used for deciding the return position.

That is, for example, using information on the position, time, and the like at each point where the position measurement process has been successful so far as information on control of the moving object used for deciding a movement method, a history of the movement speed and movement direction of the moving object and the like at each point where the position is measured by the position measurement unit 110 is acquired.

Next, in step S208 (determination step), the restart method is decided on the basis of the history information on the position and time at each point where the position measurement has been successful so far, and history information such as the movement speed and movement direction of the moving object which are acquired in step S207.

The restart method includes a return position which is a point where control of the moving object is restarted and a driving method such as movement to the return position. In the present embodiment, a point where it is determined that the control of the moving object can be continued (successful position measurement) immediately before a point where the control of the moving object is interrupted is defined as the return position. Meanwhile, the return position may be a point before the point where the control is interrupted.

The driving method such as movement to the return position is decided by obtaining an amount of movement and a movement path. In the present embodiment, time-series information on the movement speed and movement direction of the moving object from the return position to the current point which is acquired by the first input unit 150 is rearranged so as to go back in time, and the amount of movement and the movement path are decided so as to control the moving object on the basis of the rearranged information.

Figure 3:
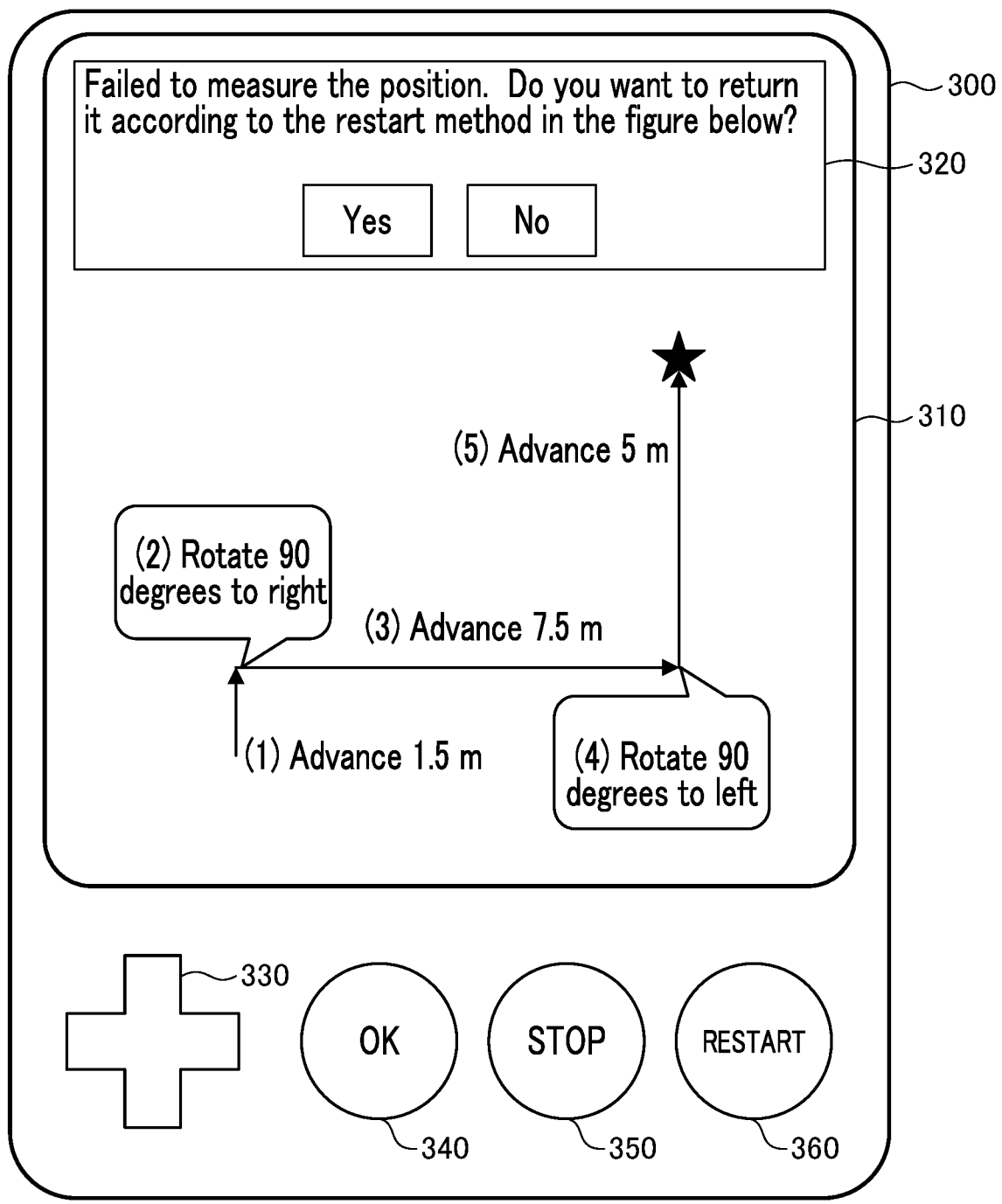
FIG. 3 is a diagram illustrating an example in which a restart method is displayed on a return method presentation unit of the first embodiment.

In step S209, the restart method decision unit 170 presents the restart method decided in step S208 to a user through, for example, a wireless network. FIG. 3 is a diagram illustrating an example in which the restart method is displayed on the restart method presentation unit of the first embodiment.

As a presentation method, a method of performing display on the user's interface (UI) of a user-operated terminal 300 serving as the restart method presentation unit 180 as shown in FIG. 3 will be described. The user-operated terminal 300 has a restart method display unit 310, a character display unit 320, a cross button 330 used for moving up/down/right/left and selecting options, and an OK button 340 for accepting display content. A joystick, a track ball, or the like may be used instead of the cross button 330.

Furthermore, the user-operated terminal 300 has a STOP button 350 for instructing the interruption of control of the moving object and a RESTART button 360 for instructing the restart of the position measurement process. The character display unit 320 can display the fact that the position measurement process has failed, options in the case of movement to the return position, and the like in a sentence.

The restart method display unit 310 displays a sentence such as, for example, "Failed to measure the position. Do you want to return it according to the restart method in the figure below? Yes or No" on the character display unit 320 so that the return position, the method of movement to the return position, the path, and the like can be visually recognized. In addition, if a user wants to correct or adjust the restart method or the like decided by the restart method decision unit 170 in step S208, the user selects No using the cross button 330 and then presses the OK button 340 to select a change of the restart method.

Thereafter, the cursor is moved in the screen using the cross button to adjust the restart method such as the return position and press the OK button 340. The restart method decision unit 170 stores the restart method changed by the user as an updated restart method.

Meanwhile, in the present embodiment, the restart method display unit 310 has been described as being included in a user terminal such as, for example, a smartphone which is separate from the moving object. However, the restart method display unit 310 may be mounted in the moving object or may be a screen of a smartphone that is an external terminal which is separate from the moving object, as described above, or a PC monitor connected to a PC, and is not limited to the configuration of the present embodiment. In addition, the mounted buttons and display unit are likewise not limited to the example of FIG. 3.

After the restart method decided in step S208 is presented to the user in step S209, the moving object control unit 120 restarts the control of the moving object in step S210 using the restart method decided in step S208 if there is no change in the restart method performed by the user. On the other hand, if there is a change in the restart method performed by the user, the restart method decision unit 170 restarts the driving control of the moving object in the moving object control unit 120 in step S210 on the basis of the changed restart method.

Here, the moving object control unit 120 functions as a control unit that controls driving of the moving object, and the control unit executes the restart method decided by the restart method decision unit 170 in step S208 or a restart method specified by the user.

The moving object control unit 120 drives the moving object toward the return position (including a rotational position) on the basis of the return position finally decided by the restart method decision unit 170 and the driving method for return, and the position measurement unit 110 restarts the position measurement process. At that time, the position measurement may be performed by referring to an environment map obtained by SLAM.

The above is a process flow according to the present embodiment. Meanwhile, an example in which, when the position measurement has failed, the control of the moving object is interrupted and the restart method is decided has been described in the present embodiment. However, if the reliability of the position measurement process or the like becomes equal to or less than a certain reference threshold in a state in which the position measurement has not failed, the control of the moving object may be interrupted and the restart method may be decided.

Meanwhile, the history information relating to the control of the moving object acquired in step S207 may be odometry information such as the amount of tire rotation for moving the moving object, and the amount of movement may be calculated from the odometry information. In addition, an inertial measurement unit (IMU) may be mounted in the moving object, and the amount of movement and its movement path may be calculated from information of the IMU and its movement time. In addition, a global positioning system (GPS) unit may be mounted in the moving object, and the amount of movement and its movement path may be calculated from a movement history of the GPS unit. In addition, an image of the moving object may be separately captured by a monitoring camera, and the amount of movement and its movement path may be calculated from video of the monitoring camera.

In addition, the movement method may be decided by retroactively performing a command in an opposite direction on the basis of control command information of the moving object from the return position to a point at which it is determined that the control of the moving object needs to be interrupted. In addition, the method of presenting the restart method in step S209 may be an audio guide or the like for reading out the movement method by audio in addition to the presentation method using the UI. Meanwhile, in the case of display using the UI, the return position may be superimposed on the environment map obtained by SLAM.

In addition, the presentation unit may be provided with a decision input unit for the user to decide whether to actually execute the restart method, and if there is no input from the user for a predetermined time or more, for example, after the restart method is presented in step S209, the restart method which is automatically presented may be executed. In addition, a plurality of restart methods to be presented may be presented instead of one, and the user may be able to specify which restart method to use.

In addition, a return in-progress warning unit for warning that the return is in progress during movement to the return position may be provided. As the warning method performed by the return in-progress warning unit, various warning methods can be selected, such as display on the same UI as the restart method presentation unit 180, audio notification that the return is in progress, or a warning melody determined in advance that is played during the return.

As described above, according to the information processing device of the present embodiment, even if the control of the moving object is interrupted due to a failure in the position measurement, position and posture measurement can be quickly returned and the control of the moving object can be restarted.

In addition, since the decided restart method can be displayed on a graphical user interface (GUI) and presented to the user, an optimum restart method can be selected by the user's determination.

[Second embodiment] In a second embodiment, as a modification example of the first embodiment, the restart method is decided using an image captured in order to measure the position of the moving object. Since the overall configuration diagram and process flow are the same as in the first embodiment, the description thereof will be omitted, and a brief description will be given below with focus on differences from the first embodiment.

In the present embodiment, the history information which is acquired from the position measurement unit 110 includes a history of a captured image of the surroundings of each point when the position measurement is performed. That is, as information relating to the position measurement which is acquired by the first input unit 150, a history of a captured image and position information at each point where the position measurement process is performed is acquired.

The restart method decision unit 170 decides the movement method so as to move to a point at which an image similar to the captured image at the return position can be captured. As in the case of the first embodiment, the return position is a point at which it is determined that the control of the moving object can be continued immediately before the point at which the control of the moving object is interrupted. Meanwhile, the return position may be a point before the point at which the control is interrupted.

A method of deciding the movement method will be described. The point at which it is determined that the control of the moving object needs to be interrupted is set as a starting point, and the captured image at each point from the starting point to the return position which is acquired by the first input unit 150 is used as a reference image group.

The moving object is rotated and moved back and forth and right and left little by little from the starting point, and is moved until matching between an image of the reference image group one before the starting point and the current captured image is performed and matching of a predetermined reliability determined in advance or higher is realized. That is, the restart method decision unit decides a method of restarting the moving object on the basis of the result of matching between the history of the captured image and the current captured image.

Thereafter, based on the position information in which the reference image acquired by the first input unit 150 is captured, the moving object is moved to a position at which the next reference image is captured and matching between the reference image and the current captured image is performed. In this way, the movement of the moving object and the matching process are repeatedly performed to move the moving object to the return position, and the movement is terminated if matching with the reference image at the return position is realized. As the reference of matching, matching is assumed to be completed if the degree of similarity is a constant value or more such as in a case where the degree of similarity of the matching processing result is 90% or more.

In the present embodiment, although the matching process and the movement are repeatedly performed using a plurality of reference images from the starting point to the return position, the matching process and the movement may be repeatedly performed using one reference image at the return position. In that case, the rotation and the movement back and forth and right and left from the starting point are repeated to perform matching between captured images at the current point and the return position.

When a matching feature point is found, the movement is performed in the direction in which deviation between the features of the matching result is reduced, and the matching process is performed again. In this way, if the movement of the moving object and the matching process are repeatedly performed and matching equal to or higher than a reference determined in advance is achieved, it is determined that the movement to the return position is completed.

In the present embodiment, the matching process is performed while performing the movement from the starting point little by little, but the starting point for starting the matching process can also be set as any point specified by the user.

A method of calculating the degree of similarity of the matching processing result may be a sum of squared differences (SSD), normalized cross correlation (NCC), or the like, and the calculation method is not limited. In addition, the reference of matching may be determined by providing a different reference value as the degree of similarity for each feature point.

[Third embodiment] In a third embodiment, as a modification example of the first embodiment, a method of deciding a return position from the success rate (reliability) of position measurement calculated in advance will be described. Since the overall configuration diagram and process flow are the same as in the first embodiment, the description thereof will be omitted, and the decision of the return position different from the first embodiment will be briefly described.

In the present embodiment, the history information which is acquired from the position measurement unit 110 includes a history such as success or failure information relating to the success or failure of position measurement at each point (reliability information relating to the reliability of the position measurement process) or the number of feature points when the position measurement is performed.

In the position measurement process, as the number of features in an image registered in an environment map becomes larger, the degree of success (reliability) becomes higher. In the present embodiment, the number of feature points in an image during the creation of the environment map is defined as the degree of success (reliability) of the position measurement process, and is used when the restart method decision unit 170 decides the return position.

The information relating to the position measurement which is acquired by the first input unit 150 is defined as the degree of success of the position measurement process, and the restart method decision unit 170 sets a point having a certain degree of success or higher as the return position. In addition, a method of movement to the return position is decided from information relating to the control of the moving object.

Meanwhile, although a description has been given using the SLAM process based on feature points in an image in the present embodiment, the present embodiment is not limited to SLAM based on feature points, and is also not limited to SLAM using a captured image. In addition, although the number of feature points in an image is defined as the degree of success, a relationship between the number of feature points in an image and the reliability of the position measurement process may be calculated from the past position measurement processing result and used as the degree of success.

In addition, although the degree of success of the position measurement process is calculated from the number of feature points in an image, the degree of success may be calculated by creating a database from the past position measurement result. Alternatively, the degree of success may be calculated in consideration of whether the spatial distribution of features in an image is uniform or whether the distribution of features in an image is random rather than periodic. In addition, the degree of success may be calculated by combining conditions influencing the result of the position measurement process such as environmental conditions in which the moving object moves, such as illuminance or unevenness of the ground.

[Fourth embodiment] In a fourth embodiment, a method of deciding a restart method so as to avoid the cause of a failure in the position measurement process will be described.

Figure 4:
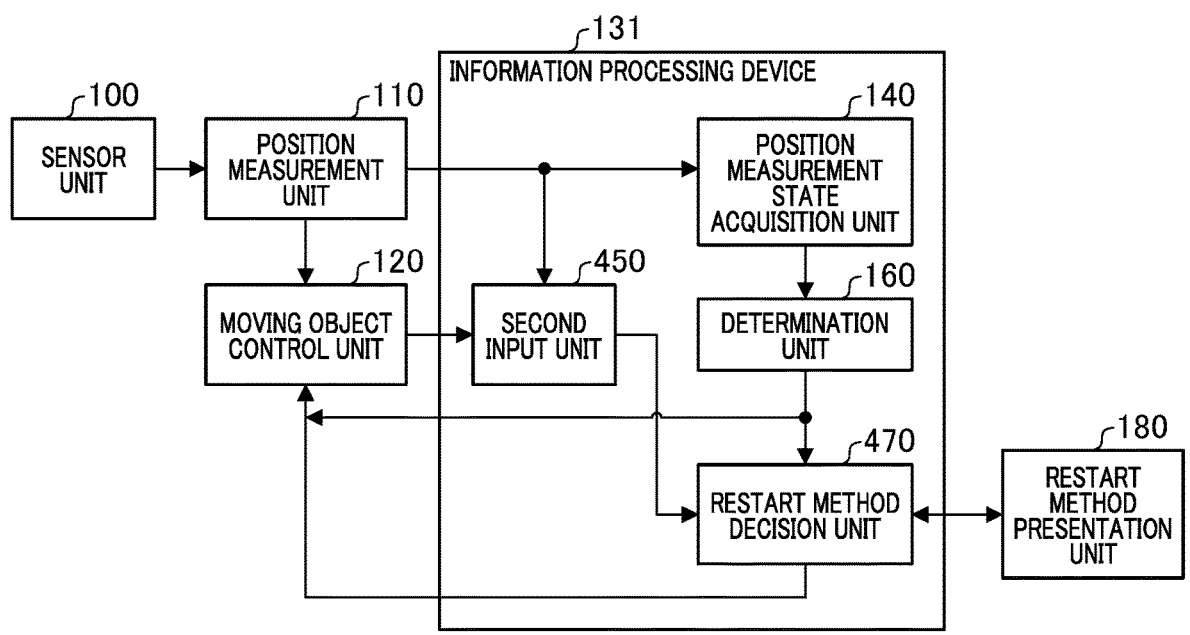
FIG. 4 is a functional block diagram of a moving object including an information processing device of a second embodiment.

FIG. 4 is a functional block diagram of a moving object including an information processing device of a second embodiment. The same portions as those of the first embodiment will not be described, and a second input unit 450 and a restart method decision unit 470 which are different from those of the first embodiment will be briefly described. 2000 is a moving object, and 131 is an information processing device.

In addition, when the position measurement unit 110 fails to measure the position of the moving object, the position measurement unit 110 outputs information that may be a cause of the failure all together. In addition, in the present embodiment, the restart method decision unit 470 decides at least one of a return position and a movement method for avoiding the cause of the failure.

That is, the second input unit 450 acquires a history of information that may be a cause of a failure in the position measurement process in addition to the information relating to the position measurement process performed by the position measurement unit 110 and the information relating to the control of the moving object. In the present embodiment, the information relating to the cause of failure includes at least one of history information relating to illuminance of the surroundings of the moving object, history information relating to the orientation of an imaging element of the sensor unit 100 mounted in the moving object, and history information relating to the number of feature points in an image.

That is, the history information from the position measurement unit 110 includes history information relating to a position at each point where the position measurement process is performed, time information, history information relating to the success or failure of the position measurement process, and information relating to the cause of a failure in position measurement.

In this way, in the present embodiment, the history information which is acquired from the position measurement unit 110 includes a history of information that may be a cause of failure relating to the success or failure of position measurement at each point when the position measurement is performed.

Illuminance history information relating to illuminance around the moving object, imaging direction history information relating to a history of the direction of the imaging element in the sensor unit 100, and driving history information relating to a history of driving (the movement direction, the amount of movement, the movement speed, and the like) of the moving object are acquired from the position measurement unit 110. Meanwhile, in the present embodiment, the direction of the imaging element can be changed by changing the direction of the moving object without including a pan and tilt mechanism for changing the direction of the imaging element, but the pan and tilt mechanism may be provided.

The restart method which is decided by the restart method decision unit 470 will be described for each cause of a failure in position measurement. For example, if it is determined that the cause of a failure in position measurement is a drastic change in illuminance or abnormal illuminance, the restart method decision unit 470 decides the return position and the movement method so that the illuminance around the moving object can be obtained stably and appropriately.

That is, the direction of the imaging element of the sensor unit considered to be successful in the position measurement process and the direction of the imaging element of the sensor unit considered to be unsuccessful are decided on the basis of the information on illuminance around the moving object which is acquired by the second input unit 450. The illuminance relevant to the success or failure of the position measurement process is calculated or measured in advance.

Next, compared to the orientation of the imaging element of the sensor unit 100, when the imaging element is facing the direction of low illuminance or high illuminance in which image capture performed by the imaging element fails, the orientation of the moving object itself is changed (rotated) so that the imaging element is oriented in the direction of appropriate illuminance which is successful in the position measurement process. Thus, the restart method decision unit 470 decides that the return position is in place and that the movement method is to rotate the moving object so that the imaging element is oriented in the direction of appropriate illuminance which is successful in the position measurement process.

If the illuminance around the moving object is illuminance in which the position measurement process fails such as in the case of being all dark, a point where illuminance is successful in the position measurement process before that point is set as the return position. As the movement method, the method described in the first embodiment is performed. In addition, if it is determined that the cause of a failure in position measurement is lack of feature points in an image, the restart method decision unit 470 decides the movement method so as to change the orientation in a direction in which the feature points in an image can be sufficiently detected.

The return position is set to be in place. In addition, as in the third embodiment, the degree of success may be calculated in advance from the number of feature points in an image, and a point having a certain degree of success or higher may be set as the return position. The movement method is decided as described in the third embodiment.

Meanwhile, the above decision of the return position and the movement method is an example, and any return position and movement method may be used as long as the content of a warning reason can be avoided. In addition, the restart method may be decided from the information relating to the control of the moving object. For example, if the position measurement process fails after the traveling direction is changed, the restart method decision unit 470 decides the restart method with the return position as the "current point" and the movement method as "return in the immediately preceding traveling direction."

Figure 5:
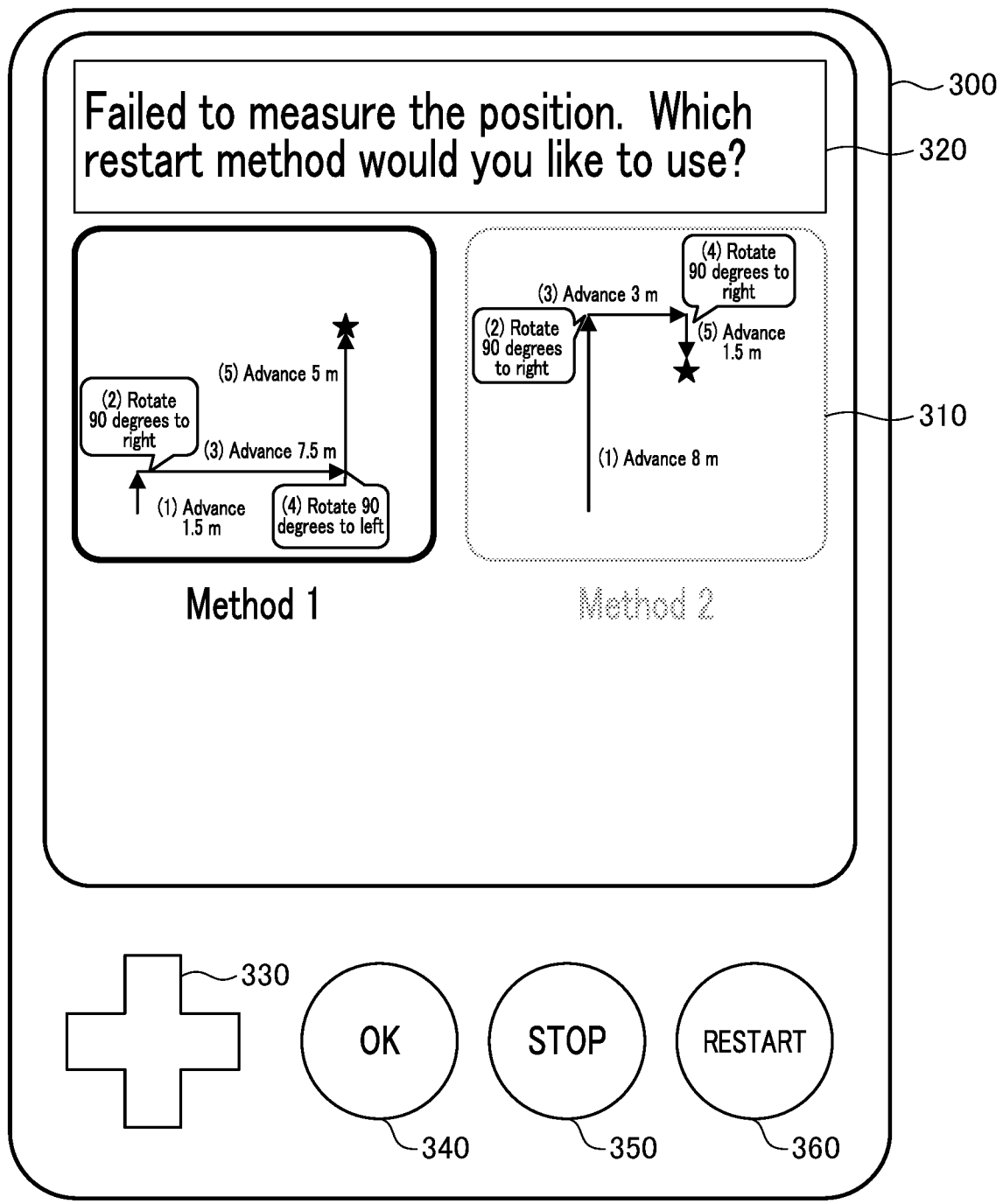
FIG. 5 is a diagram illustrating an example of a restart method presentation unit that displays a plurality of restart methods of the second embodiment.

As described above, if a plurality of restart methods can be considered, the restart method presentation unit 180 presents a plurality of restart method candidates as shown in FIG. 5. FIG. 5 is a diagram illustrating an example of a restart method presentation unit that displays a plurality of restart methods of the second embodiment. As shown in FIG. 5, "Failed to measure the position. Which restart method would you like to use?" and the like are displayed so that the user can choose from the candidates In FIG. 5, two restart method candidates, that is, method 1 and method 2, are displayed. The user operates the cross button 330 to select a restart method desired to be executed from the candidates, and operates the OK button 340 to confirm the selection.

As described above, the position measurement unit 110 in the example periodically performs position measurement or the like on the moving object using a captured image of the surroundings of the moving object captured by the sensor unit 100, and stores information on the measured position of the moving object or the like as history information. In addition, the position measurement unit 110 has a memory inside of it, and stores and outputs the measurement result when the position measurement process is periodically performed as history information.

As in the first embodiment, the above history information includes position history information relating to a history of position information at each point, that is, a history of the position of the moving object, a history of information on a date and time when position measurement at each point is performed, and the like. Further, as in the second embodiment, a history of a captured image of the surroundings at each point may be included.

In addition, as in the third embodiment, the above history information may include a history of success or failure information relating to the success or failure of position measurement at each point (reliability information relating to the reliability of the position measurement process). Further, as in the fourth embodiment, it may include illuminance history information relating to a history of illuminance around the moving object which influences the success or failure of position measurement and imaging direction history information relating to a history of the direction of the imaging element in the sensor unit 100 mounted in the moving object. In addition, it may include driving history information relating to a history of driving (the movement direction, the amount of movement, the movement speed, and the like) of the moving object, history information relating to the number of feature points, and the like.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

In addition, as a part or the whole of the control according to this embodiment, a computer program realizing the function of the embodiment described above may be supplied to the information processing device through a network or various storage media. Then, a computer (or a CPU, an MPU, or the like) of the information processing device may be configured to read and execute the program. In such a case, the program and the storage medium storing the program configure the present disclosure.

This application claims the benefit of Japanese Patent Application No. 2021-088860 filed on May 27, 2021, which is hereby incorporated by reference herein in its entirety.

What is claimed is:

1. An information processing device comprising:
   at least one processor and at least one memory, cooperating to:
   measure a position of a moving object while the moving object is moving based on an image around the moving object,
   acquire success or failure information relating to success or failure of position measurement in the position measurement step based on illuminance around the moving object,
   acquire information relating to a history of illuminance around the moving object,
   determine to interrupt driving control of the moving object on basis of the success or failure information acquired in the success or failure information acquisition step, and
   in a case where the moving object is determined to be interrupted, decide restarting the driving control of the moving object and move the moving object to a return position where the illuminance around the moving object was successful in the position measurement step.

2. The information processing device according to claim 1, wherein the restarting the driving control of the moving object includes at least one of a return position which is a point for restarting the driving control of the moving object and a method of driving the moving object for returning to the return position.

3. The information processing device according to claim 2, wherein the at least one processor and the at least one memory further cooperating to
present the restart method to a user.

4. The information processing device according to claim 3, wherein the at least one processor and the at least one memory further cooperating to:
control driving of the moving object, and
execute the restart method decided by the at least one processor and the at least one memory or a restart method specified by the user.

5. The information processing device according to claim 1, wherein the position measurement on the moving object using a captured image of the surroundings of the moving object.

6. The information processing device according to claim 5, wherein the at least one processor and the at least one memory further cooperating to acquire a history of the captured image of the surroundings of the moving object.

7. The information processing device according to claim 6, wherein the at least one processor and the at least one memory decide the restarting the driving control of the moving object on the basis of a result of matching between the history of the captured image and a current captured image.

8. The information processing device according to claim 1, wherein the success or failure information includes reliability information relating to reliability of the position measurement.

9. The information processing device according to claim 8, wherein the at least one processor and the at least one memory further acquire a history of the reliability information.

10. The information processing device according to claim 9, wherein the at least one processor and the at least one memory further decide the restarting the driving control of the moving object on the basis of the history of the reliability information.

11. The information processing device according to claim 1, wherein the information relating to the success or failure information relating to failure in position measurement is obtained from the history of illuminance around the moving object, and wherein movement method and return position to which the moving object is moved so that the illuminance around the moving object can be obtained appropriately.

12. A moving device comprising
at least one processor and at least one memory, cooperating to:
measure a position of a moving object while the moving object is moving based on an image around the moving object,
acquire success or failure information relating to success or failure of position measurement in the position measurement step based on illuminance around the moving object,
acquire information relating to a history of illuminance around the moving object for capturing image of the surroundings,
interrupt driving control of the moving object on the basis of the success or failure information acquired in the success or failure information acquisition step,
in a case where the moving object is determined to be interrupted, decide restarting the driving control of the moving object and move the moving object to a return position where the illuminance around the moving object was successful in the position measurement step, and
control movement of the moving object.

13. A non-transitory computer-readable storage medium configured to store a computer program comprising instructions for executing following operations:
measuring a position of a moving object while the moving object is moving based on an image around the moving object;
acquiring success or failure information relating to failure of position measurement in the position measurement step based on illuminance around the moving object;
acquiring information relating to a history of illuminance around the moving object;
determining to interrupt driving control of the moving object on the basis of the success or failure information acquired in the success or failure information acquisition step; and
in a case where determining determines that the driving control of the moving object is to be interrupted, deciding to restart the driving control of the moving object and moving the moving object to a return position where the illuminance around the moving object was successful in the position measurement step.

14. An information processing method comprising:
measuring a position of a moving object while the moving object is moving based on an image around the moving object;
acquiring success or failure information relating to success or failure of measuring the position based on illuminance around the moving object;
acquiring information relating to a history of illuminance around the moving object;
determining to interrupt driving control of the moving object on the basis of the success or failure information; and
in a case where determining determines that the driving control of the moving object is to be interrupted, deciding to restart the driving control of the moving object and moving the moving object to a return position where the illuminance around the moving object was successful in the position measurement step.

* * * * *